(No Model.)

A. J. HARRINGTON, Jr. & R. S. WARNOCK.
CULTIVATOR.

No. 565,979. Patented Aug. 18, 1896.

Witnesses
J. Koerth.
V. B. Hillyard.

Inventors
Andrew J. Harrington Jr.
and
Robert S. Warnock,
By their Attorneys,
C. A. Snow & Co.

UNITED STATES PATENT OFFICE.

ANDREW J. HARRINGTON, JR., AND ROBERT S. WARNOCK, OF MAGNOLIA, ARKANSAS.

CULTIVATOR.

SPECIFICATION forming part of Letters Patent No. 565,979, dated August 18, 1896.

Application filed February 1, 1896. Serial No. 577,697. (No model.)

*To all whom it may concern:*

Be it known that we, ANDREW J. HARRINGTON, Jr., and ROBERT S. WARNOCK, citizens of the United States, residing at Magnolia, in the county of Columbia and State of Arkansas, have invented a new and useful Cultivator, of which the following is a specification.

In agricultural implements as generally constructed for tilling the soil, and particularly in such as comprise sections flexibly connected together, great difficulty has been experienced in stiffening the joint between the sections, so that the latter will, when required, maintain a fixed relation, thereby attaining the end of a rigid and inflexible implement.

The purpose of this invention is to provide a simple and effective means for stiffening and bracing the joint between the sections and which can be thrown out of operative relation at a moment's notice when it is required to have the sections yield to adapt themselves to the sides of a row or to lift one or the other section, so as to clear the implement of trash or to avoid a root or other unyielding obstruction.

Various other objects are attendant upon the invention and will appear as the nature of the improvement is unfolded; and to this end the same consists of the novel features, which hereinafter will be more particularly set forth, claimed, and illustrated in the accompanying drawings, in which—

Figure 1:
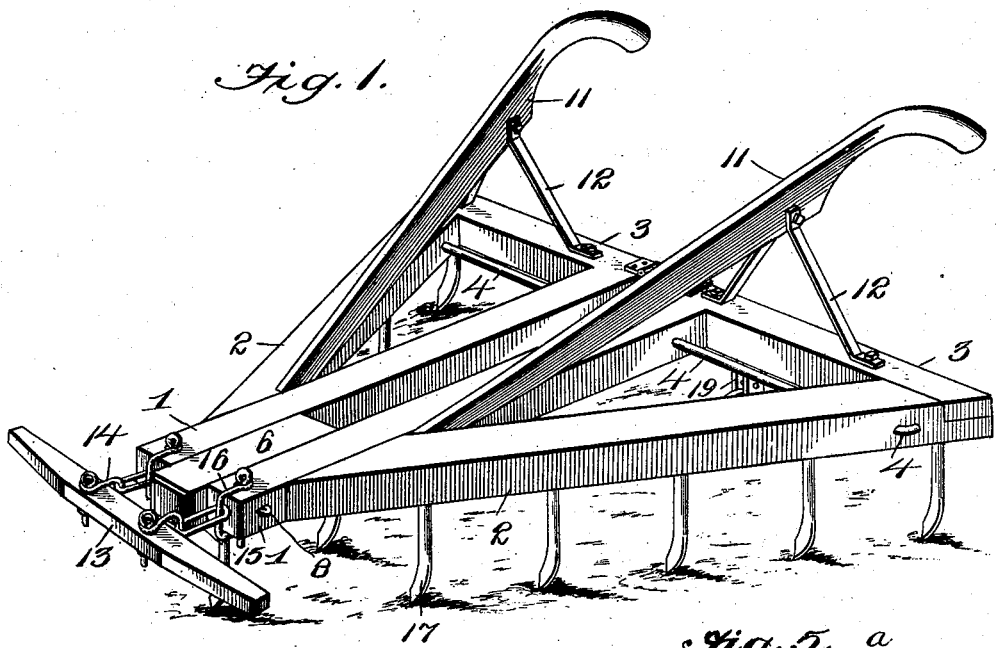
Figure 5:
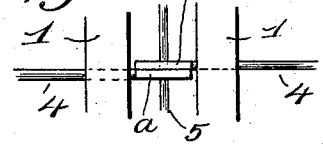
Figure 2:
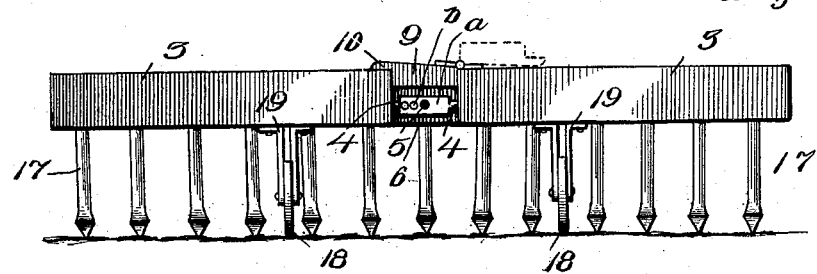
Figure 3:
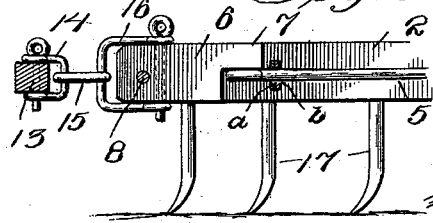
Figures 4, 6:
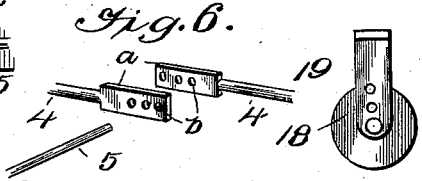

Figure 1 is a perspective view of a harrow constructed in accordance with the principles of this invention. Fig. 2 is a rear view thereof, the handles being omitted, and showing the rear block turned back out of the way by dotted lines. Figs. 3, 4, 5, and 6 are detail views.

Corresponding and like parts will be designated and referred to in the following description and all the figures of the accompanying drawings by similar reference-characters.

The harrow or implement comprises two similarly-constructed sections, each consisting of an inner longitudinal bar 1, an outer inclined or oblique bar 2, and a rear bar 3, connecting the rear terminals of the bars 1 and 2 in a substantial manner. The bars 1 are parallel and have rods 4 projecting beyond their inner or opposing sides and terminating in flattened portions *a*, which overlap and have eyes *b* to receive a rod 5, which completes and forms the hinge or flexible connection between the two sections. Upon withdrawing the rod 5 the sections can be readily separated, and in order to prevent its accidental displacement a block 6 is interposed between the front ends of the sections, and has its lower rear portion cut away to receive the front end of the rod 5 and to provide an overhanging portion 7, by means of which the said block is prevented from dropping at its rear end by having the part 7 engaging with the front end of the rod 5. A pin 8 passes through the front ends of the bars 1 and supports the block 6, and holds the latter in proper position between the sections, and by removing the pin 8 the block 6 can be detached, so as to admit of one or both of the sections tilting upon the rod 5.

A block 9 is hinged to one of the sections near the rear thereof and is adapted to come between the bars 1 and to supplement the action of the block 6 in stiffening the joint and bracing the sections, so that the latter will maintain a fixed relation the same as if the two sections were constructed of a single substantial framework. A lip 10 is at the free end of the block 9 and overlaps the section opposite to that carrying the block, and is provided to support the block 9 in operative position between the sections. When it is required to secure the advantages of a flexible connection between the sections, the block 6 is removed in the manner set forth and the block 9 is turned back upon the section to which it is hinged, as shown by the dotted lines in Fig. 2.

By reason of the flattened portions *a* having a series of eyes *b* the harrow-sections can be moved apart or brought closer together, thereby admitting of a varied adjustment within certain limits, the adjustment being effected by removing the rod 5 and again passing it through registering eyes *b* after the parts are properly located. The blocks 6 and 9 must be provided in various lengths to allow for the different adjustments of the sections.

The handles 11 are attached at their front ends to the bars 1 and are supported at a point between their ends by braces 12, which are bolted or otherwise secured at their ends to the handles and the rear bars 3, said braces being formed of bar-metal or a strip cut into required lengths and secured to the parts substantially as set forth.

The draft-bar 13 is provided with clevises 14, which are connected by links 15 with corresponding clevises 16, provided at the front ends of the harrow-sections, and a team or a single horse can be hitched to the draft-bar, so as to draw the implement over the field for cultivating purposes.

The shovels 17 are secured at proper intervals in the length of the oblique bars 2, and are properly positioned so as to throw the soil to one or the other side, or equally to both sides, as required, and when desired to cultivate at a middle point the block 6 is supplied with a shovel, as shown.

To regulate the depth of cultivation, gage-wheels 18 are provided and adjustably mounted in hangers 19, pendent from the harrow-sections, and these hangers have a vertical series of openings to receive the pins or journals upon which the gage-wheels are mounted.

From the foregoing it will be seen that the improvement is susceptible of various changes in the form, proportion, and the minor details of construction without departing from the principle or sacrificing any of the advantages thereof.

Having thus described the invention, what is claimed as new is—

1. In an agricultural implement, the combination of two sections having oppositely-extending eyes which are adapted to overlap, a rod passing through the registering eyes and pivotally connecting the sections, a block removably fitted between the adjacent portions of the sections to brace and stiffen the latter and adapted to engage with the aforesaid rod and hold it in place, and a block hinged to one of the sections at the end remote from the first-mentioned block and adapted to fold thereon and to be turned so as to extend between the sections, substantially in the manner and for the purpose set forth.

2. In combination, two sections having eyes extending in opposite directions from their inner or opposing sides, a rod passing through the eyes and connecting them and the sections in a flexible manner, the front end of the rod being enlarged, a block removably fitted between the front ends of the sections to brace and stiffen the joint between them and having its rear portion recessed and receiving the front end of the said rod, and a pin having the block mounted thereon and removably connecting it to the sections, substantially in the manner and for the purpose set forth.

3. The herein-specified agricultural implement, comprising similarly-formed sections provided with shovels and vertically-adjustable gage-wheels, a hinge or flexible connection between the sections, front and rear blocks removably fitted between the sections to stiffen and brace the flexible joint between them, a draft-bar connected with each of the sections, and independent handles supported at their rear ends by braces, substantially in the manner shown and for the purpose set forth.

In testimony that we claim the foregoing as our own we have hereto affixed our signatures in the presence of two witnesses.

ANDREW J. HARRINGTON, Jr.
ROBERT S. WARNOCK.

Witnesses:
JOHN J. POPE,
WM. M. JOINER.